United States Patent [19]

Steinmetz

[11] Patent Number: 4,763,578

[45] Date of Patent: Aug. 16, 1988

[54] METHOD FOR CONTROLLING A MAGNETIC SUSPENSION VEHICLE

[75] Inventor: Günter Steinmetz, Haren, Fed. Rep. of Germany

[73] Assignee: Messerschmitt-Bölkow-Blohm GmbH, Munich, Fed. Rep. of Germany

[21] Appl. No.: 833,720

[22] Filed: Feb. 26, 1986

[30] Foreign Application Priority Data

Mar. 2, 1985 [JP]  Japan ................................ 60-3507442

[51] Int. Cl.$^4$ ............................................. B60L 13/06
[52] U.S. Cl. ................................................... 104/284
[58] Field of Search ............... 104/284, 281, 282, 286, 104/89; 324/207, 208; 364/153, 154, 184

[56] References Cited

U.S. PATENT DOCUMENTS

| | | | |
|---|---|---|---|
| 3,278,770 | 10/1966 | Shoh | 364/153 X |
| 3,419,772 | 12/1968 | Ross | 364/153 X |
| 3,512,852 | 5/1970 | North | 104/284 X |
| 3,526,886 | 9/1970 | Lubich | 324/207 |
| 3,736,880 | 6/1973 | Ross | 104/284 X |
| 3,881,651 | 5/1975 | Wilhelm, Jr. | 364/154 |
| 3,968,753 | 7/1976 | Breitling | 104/284 X |
| 4,505,206 | 3/1985 | Gottzein | 104/284 |

FOREIGN PATENT DOCUMENTS

| | | | |
|---|---|---|---|
| 3417502 | 11/1985 | Fed. Rep. of Germany | 104/284 |
| 1371143 | 1/1972 | United Kingdom | 104/284 |
| 2170023 | 7/1986 | United Kingdom | 104/281 |

OTHER PUBLICATIONS

"Control Systems for Operating the Long Sktor Maglev Vehicle TRO5" IEEE-1980 KOERV, pp. 23–34.

*Primary Examiner*—Robert B. Reeves
*Assistant Examiner*—Scott H. Werny
*Attorney, Agent, or Firm*—Kenyon & Kenyon

[57] ABSTRACT

A method for controlling a magnetic suspension vehicle which is guided by means of lenitation and guidance magnets (magnetic wheels) along a track by means of individual magnet controls for each magnetic wheel. The controller signals ($U_R$) or at least portions ($U_{Su}$) of these signals are stochastically falsified for the individual magnet controls during standstill suspension or at low travel velocities of the magnetic suspension vehicle independently of each other. Thereby, the central interference possibilities of the track to the system vehicle/track are decentralized and asynchronized, so that all controls act independently of each other and the magnetic suspension vehicle or the dynamic overall system can be kept stable also at standstill and at low travel velocities.

4 Claims, No Drawings

METHOD FOR CONTROLLING A MAGNETIC SUSPENSION VEHICLE

BACKGROUND OF THE INVENTION

The present invention relates to a method for controlling a magnetic suspension vehicle.

Since the start of their development, magnetic suspension vehicles have been saddled with the problem that at low velocities or if the magnetic suspension vehicle is standing still, the overall system track/magnetic suspension vehicle has a tendency toward dynamic instability. Instability occurs in cases which involve modal track configurations with small masses and small relative damping, i.e., with the desired relatively elastic tracks. Even with relatively rigid tracks having large track masses it has been found that in some track configurations the overall system can be at the stability limit. Due to such dynamic instabilities, the system track/vehicle can start to vibrate, which can lead to strong vibration motions of the magnetic suspension vehicle and, in extreme cases, to damage to the track or parts of the magnetic suspension vehicle. For cost reasons, only tracks with small track mass, i.e., relatively elastic tracks, can be realized. These tracks are designed so that they take essentially only static traffic loads and have only small reserves for dynamic "supplementary" loads. It is therefore economically impossible to prevent the mentioned instabilities by erecting stiff tracks with large track masses. A solution to the problem can be found essentially only in the design of the magnetic suspension vehicle and in particular, by its "control intelligence".

The systems constructed so far provide no universal solution to the instability problem; mostly, compromises have been sought on an experimental basis which are sufficient for the limited requirements of experimental systems. However, these compromises apply only to the individual systems. They can therefore not apply to the desired application-oriented goal of making many types of track compatible and of meeting at the same time the necessary safety requirements.

For the method under discussion here, it is assumed that the magnetic suspension vehicle is supported and guided by self-sufficient, autonomic and decentralized magnets, so called magnetic wheels, where each magnetic wheel has its own control with processor, sensors, control elements, magnet-current-driver etc. It can further be assumed that the number of magnetic wheels acting on a track configuration is as a rule larger than three to four. Controls of this type for magnetic suspension vehicles are known, for instance, from DE-OS No. 31 17 971, assigned to the assignee of this application.

SUMMARY OF THE INVENTION

It is an object of the present invention to modify the control of magnetic suspension vehicles in such a manner that all instabilities conceiveable involving real tracks, especially the mentioned dynamic instabilities in tracks of small track mass, are reliably avoided.

The above and other objects of the present invention are achieved by a method for controlling a magnetic suspension vehicle which is guided by means of elevation and guidance magnet means along a track, individual magnet control means being provided for each magnetic means responsive to a plurality of control signals, the method comprising the step of stochastically falsifying the control signals or at least portions of the control signals for the individual magnet control means independently of each other during suspension of the magnetic suspension vehicle at standstill or at low travel velocities.

Accordingly, the control signals or portions of these control signals of the respective individual controls are falsified by statistical methods in such a manner that each individual magnetic control ultimately reacts differently from every other control and thereby, the synchronicity, due to the geometric forms of the track configurations, in the reaction of the conventional decentralized controls of the magnet means or magnetic wheels, is eliminated. For this stochastic falsification, there are a number of methods, for instance:

Additive stochastic superposition of the signals furnished by the sensors or additive superposition of the sensor signals on a noise signal;

Additive and/or multiplicative addition of a stochastic signal to the control voltage or parts of the control voltage;

Stochastic change of the control parameters;
combinations of these measures.

The stochastic falsification is and can be carried out only in the suspended condition or during slow travel of the magnetic suspension vehicle. To this end, a magnetic wheel can, for instance, have a device which furnishes a signal corresponding to the travel velocity of the magnetic suspension vehicle. By this signal, the individual magnetic controls can be switched and more specifically, from the state "Standstill Control" for the velocity zero and low velocities to about 60 kilometers per hour, to the state "Travel Control". The invention is used only in the state "Standstill Control". In the travel state by means of the travel control, the instability problem practically plays no role, since the vibration starting up times of the system tracking/vehicle are then large as compared to the dwelling times of the vehicle in the individual track configurations. For the "Standstill Control", no consideration need be given to extremely good follow-up behavior of the system magnet/track. This results in greater freedom in determining the dynamic properties of the standstill control. It can be used for solving the mentioned instability problem.

DETAILED DESCRIPTION

Let us assume, for instance, that the magnetic suspension vehicle comprises, for each magnetic wheel, a known standard support-circuit control (an observer system) with the connecting branches (the control law) $U_s^{\prime\prime}$, $U_s^{\prime}$, $U_s$, and $Uf_s$ and a pulse-width-controlled magnet current driver. It will be assumed that the air gap between the magnet and the rail and the magnet acceleration are available as sensor signals, i.e., as the measurement quantities.

These measures have no limiting significance; the invention is equally applicable to other control structures, to other sensor signals, for instance, besides the air gap, to the magnetic flux or the magnet current and to other magnet current control elements. In particular, it appears promising to use a standard support circuit controller with a series-connected lead lag filter as the basic model of the controller, in which the invention is applied, since with appropriate design of the filter, substantially the high-frequency track configurations remain as problems and the invention is especially advantageous and easily realizable with respect to them.

Among other things, this derivative filter could be blanked out at higher velocities similarly to a "stochastic supplemental device".

In a conventional magnetic suspension vehicle, 32 magnetic wheels act in the support direction on, for instance, a 25 meter beam of the track. If known individual magnet controls are used, all these individual magnetic wheels react identically to the same input signals. A common indirect input signal, however, can be the beam motion, for instance, when the track is set into vibration. If now an individual magnet control reacts to a certain beam configuration with one phase which causes instability, then all controls do the same, i.e., the system track/magnetic suspension vehicle is fanned into vibrations (the relatively small modal internal beam damping is then obviously too small to stabilize the dynamic overall system).

By the stochastic treatment of the controller signals according to the invention, provision is now made that the individual controls do not all react to the beam motion in the same way, i.e., asynchronously in a certain manner as a function of the control voltage amplitude. In principle, the individual magnet controls cause, in spite of the central synchronous movement for all controls, no substantial outward or summary effect on the central system track or track configuration.

The amplitude response of the total control force of all individual magnets per track beam is changed via the multiplicity of the magnetic wheels by the statistical modification of the individual control signals, independently from the phase response. This independent change of the amplitude response to the phase response is possible only for several individual controls, the control signals or partial signals of which are treated stochastically according to the invention.

To explain the invention in more detail, a conventional "support circuit control" of the type mentioned above will be taken as the base; its controller voltage $U_R$ has the following composition:

$$U_R = U_{\ddot{Z}} + U_{\dot{S}} + U_S + U_{fS} \quad (1)$$

The controller voltage varies between $-10$ V and $+10$ V. Z is the magnet acceleration; S and S are the air gap and its derivative in time, respectively.

According to the invention, the controller voltage $U_R$ is formed as follows:

$$U_R = U_{st} + U_S + U_{fS}$$

In the equation, $U_{st}$ is a statistical or stochastic signal which is formed from the sum signal:

$$U_{Su} = U_S + U_Z \quad (2)$$

in the following manner: The entire voltage range from $-10$ V to $-10$ V is subdivided into adjoining ranges, for instance, into the following ten ranges:

| Range | |
|---|---|
| $-5$ | from $-10$ V to $-7.5$ V |
| $-4$ | $-7.5$ V to $-4$ V |
| $-3$ | $-4$ V to $-2$ V |
| $-2$ | $-2$ V to $-1$ V |
| $-1$ | $-1$ V to $0$ V |
| 1 | $0$ V to $1$ V |
| 2 | $1$ V to $2$ V |
| 3 | $2$ V to $4$ V |
| 4 | $4$ V to $7.5$ V |
| 5 | $7.5$ V to $10$ V |

The following consideration for forming the statistical signal $U_{st}$ is carried out only for positive sum signals; the same applies, logically applied, also for negative sum signals.

The sum voltages $U_{Su}$ are formed or interrogated periodically at times closely following each other, for instance, at intervals of some milliseconds to fractions of milliseconds. The invidivual signals $U_{\dot{S}}$ and $U_{\dot{Z}}$ of the sum signal are present in the controller. From the respectively formed or interrogated sum signal, the statistical signal $U_{st}$ is formed and is held until the next sum signal is formed or interrogated. From this new sum signal, a new signal $U_{st}$ is formed and held again etc. The latter is realized in every individual magnet control independently of the other individual magnet controls. The components of the sum signal in each range are determined and are then multiplied by a stochastic multiplier factor p which can assume different values for the individual ranges. The thereby "statistically weighted" signal portions of all ranges are added up to form the statistical signal $U_{st}$ and used in the controller sum-voltage equation and are processed further.

The sum signal $U_{Su}$ assumes, for instance, the measured value X within range 4 and is therefore between 4 V and 7.5 V. The share of the sum signal in the ranges 1, 2 and 3 between 0 and 4 V cover these ranges completely and can therefore be formed by the difference of the applicable upper and lower limit of the ranges. The statistical signal $U_{st}$ can be written as follows:

$$U_{st} = (1-0) \times p(\text{range 1}) + \\ (2-1) \times p(\text{range 2}) + \\ (4-1) \times p(\text{range 3}) + \\ (X-4) \times p(\text{range 4}) \quad (4)$$

The stochastic factor p(range 1) is assumed to be a dice-thrown number of an even distribution between a lower and an upper limit fixed for this region $a_{1,u}$ and $a_{1,o}$, for instance, between 0 and 2.

The stochastic factor p(range 2) is likewise to be assumed to be a dice-thrown number from an even distribution between $a_{2,u}$ and $a_{2,o}$ for instance, between $-0.5$ and $1.5$.

The stochastic factor p(range 3) is assumed to be a dice-thrown number from an even distribution between $a_{3,u}$ and $a_{3,o}$ for instance, between 0.67 and 1.33.

The stochastic factor p(range 4) is assumed to be a dice-thrown number from an even distribution between $a_{4,u}$ and $a_{4,o}$, for instance, $-0.8$ and 1.2.

For the sake of completeness, the stochastic factor p(range 5) will also be given which is likewise a dice-thrown number from an even distribution between $a_{5,u}$ and $a_{5,o}$, for instance, between $-1$ and $+1$.

For the ranges $(-1)$ and $(-5)$, the same range numbers $a_{-i,o}$ and $a_{-i,o}$ can be fixed as for the corresponding positive ranges and can therefore assume their values $a_{i,u}$ and $a_{i,o}$, respectively. Taking the limits for the above-mentioned range numbers as the base, it follows from the law of formation given for the statistical signal $U_{st}$ that the sum signal $U_{Su}$ can be split into individual components, the individual components being stochastic, i.e., thrown by dice, and more specifically:

voltages in the range from −1 V to +1 V (range −1 and range 1) with the average gain $(a_{i,u}+a_{i,o})/2=1$;

voltages between −2 V and −1 V (range −2) or 1 V and 2 V (range 2) with the average gain of about 0.5;

voltages between −4 V and −2 V or 2 V and 4 V, respectively, with the average gain of about 0.33;

voltages between −7.5 V and −4 V or 4 V and 7.5 V with the average gain of about 0.2;

voltages between −10 V and −7.5 V or 7.5 V and 10 V with the average gain of approximately zero.

A relatively small overall gain is advantageous, since the effect in the extreme case of instability is, of course, the more advantageous, the smaller the then "incorrectly" acting excitation. At standstill and up to about 60 km/h, usually only about 20% or less of the installed control activity of the magnetic wheel are needed.

The individual voltages are then summed up in accordance with the given equation (4) to form the statistical signal $U_{st}$.

The given set of parameters represents, of course, only an example; the final solution for the application must be found by simulation.

As particularly advantageous, the following variant is available:

The sum signal $U_{Su}$ is fed, prior to processing, to the statistical signal $U_{st}$ to a highpass element with the characteristic $F=(1+p/w_v)/(1+p/w_N)$, where $w_v=2\pi f_v$ and $w_N=2\pi f_N$. The frequencies $f_v$ and $f_N$ are set depending on the application; as practical values for a magnetic suspension vehicle, are available values for $f_v$ between 5 and 40 Hz and for $f_N$, values between 80 and 160 Hz. Optionally, for velocities higher than about 60 km/h, $f_v$ can be set equal to $f_N$ in order to not make the noise level of the overall system unnecessarily worse at high travel velocities.

In addition, the stochastic factors p(range i) are modified in such a manner that, via different limits of the respective even distributions between the values $a_{i,o}$ and $a_{i,u}$, the effective lag of a sample-and-hold stage is largely compensated, depending on whether the derivative with respect to time of the sum signal is positive or negative (the sample-and-hold stage is required for holding the statistical signal $U_{st}$ in the measuring time intervals).

The process for each generation of the statistical signal $U_{st}$ is carried out for each magnetic wheel in each individual magnet control decentralized and independently of the other controls/magnetic wheels.

The quantitative data for the range factors p, the range intervals, the distribution $a_{i,u}$ or $a_{i,o}$, the range gains to be determined therefrom and the sampling intervals given must, of course, be further optimized for the application. The numerical values given are only provided to give an idea of the principle.

In simulation tests with the quantitative data given and a sampling interval of four milliseconds, it was determined that:

the behavior of each magnet remains uninfluenced with a rigid track which ensures stability by itself;

in "strong" controls (which realize high $U_s$ values relative to the motion), the system likewise remains stable in the presence of low-frequncy track configurations (down to about 10 Hz) with low-mass tracks;

with track configurations with high eigenfrequencies which, with "strong" controls of the present kind lead exactly to instabilities, the overall system no longer provides excitation due to the stochastic control processor or only so small an excitation that the modal intrinsic track damping is sufficient for stabilizing the overall system;

the stabilizing effect generated by the stochastic asynchronism of the individual magnet controls sets-in continuously, i.e., improvements exist already from low resonance frequencies of the track on.

Further stabilization of the overall system magnetic suspension vehicle/track can be achieved by additive superposition of a controller signal on a stochastic signal. Thus, for instance, for each magnetic wheel with the magnetic suspension vehicle standing still, a noise signal can be added to the controller input signal for the air gap which is measured by a sensor. In this manner, the magnetic wheels of the magnetic suspension vehicle with their individual magnet controls are made asynchronous via the nonlinearities automatically present, for instance, due to control elements and friction, in the overall system. With conventional control methods, the system magnetic suspension vehicle track can become unstable at standstill, where however, this instability is reduced already at medium travel velocities since the dwelling time on the track beam decreases with increasing velocity.

It can be concluded from experience to date that due to the motion of the magnetic suspension vehicle, the "disturbances" of the track picked up by the decentralized air gap sensors, stabilize the overall system more than could be expected according to the dwelling time. This asynchronism is utilized intentionally by the invention also for control if the magnetic suspension vehicle is standing still. The invention uses the advantageous decentralization of the control of the magnetic suspension vehicle, i.e., control by individual magnet controllers, because thereby the effects due to malfunctioning can be minimized. At the same time, the few remaining central-system interference possibilities acting on all individual magnet controls are prevented by the stochastic processing of controller signals according to the invention.

In the foregoing specification, the invention has been described with reference to specific examples thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A method for controlling a magnetic suspension vehicle which is guided by a plurality of levitation and guidance magnet means along a track, individual magnet control means being provided for each magnet means responsive to a plurality of control signals, the method comprising the step of stochastically falsifying at least one of the control signals or at least a portion of one of the control signals for each of the individual magnet control means independently of the control signals for others of the individual magnet control means during suspension of the magnetic suspension vehicle at standstill or at low travel velocities.

2. The method recited in claim 1, wherein the entire operating range of the control signal or partial control signal is subdivided into adjacent subranges and for every control signal or partial control signal, a multiplier factor is stochastically determined at short time intervals periodically for each subrange, the value of the multiplier factor being between a defined upper and a defined lower value and respectively applying to the entire period, the components of the control signal or partial control signal lying in the subranges being multiplied by the respective stochastic multiplier factor, the stochastic control signal or partial control signal being formed by adding up the components for the entire period.

3. The method recited in claim 2, wherein the respective control signal or partial control signal, before being processed into the stochastic control signal or partial control signal, is conducted through a highpass filter means, and the stochastic multiplier factors for the subranges are modified such that, via different limits of the respective multiplier ranges, a lag of the stochastic control signal or partial control signal obtained is compensated, depending on whether the change in time of the control signal or partial control signal is positive or negative.

4. The method recited in claim 1, wherein, as the control signal, a control voltage is used, the partial voltage signals of which, depending on at least any of the gap changes between the vehicle and the track and the magnet acceleration, are stochastically influenced.

* * * * *

UNITED STATES PATENT AND TRADEMARK OFFICE
CERTIFICATE OF CORRECTION

PATENT NO. : 4 763 578
DATED : August 16, 1988
INVENTOR(S) : Günter Steinmetz

It is certified that error appears in the above-identified patent and that said Letters Patent is hereby corrected as shown below:

Title page:

In the Abstract, change "...by means of lenitation..." to read --...by means of levitation...--

In Column 2, line 30, change "...magnetic ccntrols..." to read --...magnetic controls...--

In Column 3, line 45, change "+10V.Z..." to read --+10V.$\ddot{Z}$...-- change "...S and S are..." to read --...S and $\dot{S}$ are...-- line 54, change "$U_{SU}= U_S + U_Z$" to read --$U_{SU}= U_{\dot{S}} + U_{\ddot{Z}}$ --

LINE 57, CHANGE "RANGE FROM -10 V TO - 10V" to read -- -10 V to + 10 V--

In Column 4, line 12, change "...signals $U_{\dot{S}}$ and $U_{\ddot{Z}}$..." to read --...$U_{\dot{S}}$ and $U_{\ddot{Z}}$...---

Signed and Sealed this

Seventh Day of March, 1989

Attest:

DONALD J. QUIGG

*Attesting Officer*  *Commissioner of Patents and Trademarks*